(12) United States Patent
Kang (10) Patent No.: US 9,676,385 B2
(45) Date of Patent: Jun. 13, 2017

(54) CONNECTION PRESERVATION AND TIMEOUT IN REMOTE VEHICLE TELEMATICS

(71) Applicant: Toyota Motor Engineering & Manufacturing North America, Inc., Erlanger, KY (US)

(72) Inventor: Daniel D. Kang, Chelsea, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/490,281

(22) Filed: Sep. 18, 2014

(65) Prior Publication Data

US 2016/0082952 A1    Mar. 24, 2016

(51) Int. Cl.
*B60W 30/00* (2006.01)
*H04L 29/06* (2006.01)
(Continued)

(52) U.S. Cl.
CPC ......... *B60W 30/00* (2013.01); *H04L 65/1069* (2013.01); *H04W 4/14* (2013.01); *H04W 4/046* (2013.01); *H04W 12/06* (2013.01)

(58) Field of Classification Search
None
See application file for complete search history.

(56) References Cited

U.S. PATENT DOCUMENTS 6,429,773 B1    8/2002  Schuyler
7,039,708 B1 *  5/2006  Knobl ................. B60R 25/04
                                                709/203
(Continued)

FOREIGN PATENT DOCUMENTS

| DE | 102015016928 A1 * | 7/2016 | ............. H04L 12/16 |
| EP | 1876731 A1 | 9/2008 | |
| WO | 2013126305 A1 | 8/2013 | |

OTHER PUBLICATIONS

Loreto, Known Issues and Best Practices for the Use of Long Polling and Streaming in Bidirectional HTTP, Apr. 2011, The RFC Editor, https://www.rfc-editor.org/rfc/pdfrfc/rfc6202.txt.pdf.*

(Continued)

*Primary Examiner* — John R Olszewski
*Assistant Examiner* — David Merlino
(74) *Attorney, Agent, or Firm* — Christopher G. Darrow; Darrow Mustafa PC (57) ABSTRACT

Disclosed herein are computer devices, systems, and methods for enabling persistent data connections with a vehicle and low-latency vehicle commands. A driver can use an app installed on a mobile device to send commands to a vehicle's DCM, which can execute such commands on one or more vehicle systems, such as remote ignition and door lock systems. Upon app initialization, a wakeup command can be sent to the DCM through one or more intermediary servers to establish a persistent data connection between a data center server and the DCM. Then, when the driver issues a command from the app, the command can be communicated between the data center server and the DCM directly over the persistent data connection, with lower latency. After a predetermined timeout period in which the driver has not used the mobile app, the persistent data connection can be terminated.

17 Claims, 5 Drawing Sheets

(51) Int. Cl.
*H04W 4/14* (2009.01)
*H04W 12/06* (2009.01)
*H04W 4/04* (2009.01)

(56) References Cited

U.S. PATENT DOCUMENTS

| | | |
|---|---|---|
| 7,388,466 B2 | 6/2008 | Ghabra et al. |
| 7,567,809 B2 * | 7/2009 | Ling ............... H04L 67/142 370/331 |
| 7,840,314 B2 * | 11/2010 | Simon ............... H04W 48/18 701/1 |
| 7,869,824 B2 | 1/2011 | Min |
| 7,880,609 B2 * | 2/2011 | Viegers ............... G06Q 10/06 340/521 |
| 7,885,603 B2 | 2/2011 | Santavicca |
| 8,050,815 B2 * | 11/2011 | Perry ............... B60R 25/2018 701/49 |
| 8,897,952 B1 * | 11/2014 | Palmer ............... H04W 4/00 701/29.1 |
| 2004/0158371 A1 * | 8/2004 | Iggulden ............... B60R 25/24 379/102.03 |
| 2009/0009307 A1 | 1/2009 | Takagi et al. |
| 2009/0069954 A1 | 3/2009 | Aladesuyi |
| 2011/0086668 A1 | 4/2011 | Patel |
| 2011/0102164 A1 | 5/2011 | Ghabra |
| 2012/0208519 A1 | 8/2012 | Seaver |
| 2012/0313768 A1 | 12/2012 | Campbell et al. |
| 2013/0046456 A1 * | 2/2013 | Scofield ............... G01C 21/3423 701/117 |
| 2013/0073121 A1 | 3/2013 | Kim |
| 2013/0208966 A1 * | 8/2013 | Zhao ............... G06F 9/5072 382/131 |
| 2013/0211623 A1 | 8/2013 | Thompson et al. |
| 2013/0290547 A1 * | 10/2013 | Berkema ............... H04L 69/24 709/227 |
| 2013/0297954 A1 | 11/2013 | Martin et al. |
| 2014/0215082 A1 * | 7/2014 | Backholm ............... H04L 65/1069 709/227 |
| 2014/0280699 A1 * | 9/2014 | Mohapatra ............... H04L 67/02 709/217 |
| 2015/0161832 A1 * | 6/2015 | Esselink ............... G07C 9/00015 340/5.22 |
| 2016/0140788 A1 * | 5/2016 | Delevoye ............... G07C 5/008 340/5.61 |

OTHER PUBLICATIONS

Web application; Wikipedia.com; Sep. 1, 2014.*
Machine translation of DE 102015016928 A1, Jul. 21, 2016, espacenet.com.*
"In what situations would AJAX long/short polling be preferred over HTML5 WebSockets?", retrieved from the Internet: <http://stackoverflow.com/questions/10028770/in-what-situations-would-ajax-long-short-polling-be-preferred-over-html5-websock>, [retrieved Jul. 20, 2016] (3 pages).

* cited by examiner

CONNECTION PRESERVATION AND TIMEOUT IN REMOTE VEHICLE TELEMATICS

BACKGROUND

This disclosure relates to vehicle telematics, with a particular emphasis on devices, systems, and methods for remotely controlling vehicle systems. Radio-based key fobs can send commands to vehicles wirelessly, for example, to lock or unlock the doors. In recent years, key fobs have also included remote start capabilities. However, the range of radio-based key fobs is limited to the vehicle's immediate area.

Many vehicles are now equipped with telematics systems in which digital data is communicated both to and from the vehicle. With these systems, it is possible to send remote commands over data networks. In a typical telematics system, a data communications module (DCM) in the vehicle is configured to transmit or receive data using a cellular or other type of mobile network. The DCM is equipped with an address or identifier unique to the vehicle (akin to the vehicle's own cell phone number). Because the telematics system is designed to operate over a mobile network, the DCM may need to be configured to conform to that network's communications protocols. For example, some DCMs are configured to accept messages based on the SMS (short message service) protocol employed by many mobile networks worldwide.

In some manufacturers' telematics systems, a central data center communicates with all DCMs worldwide. However, vehicles at various locations worldwide will necessarily be connected to a variety of local or regional mobile networks. Moreover, there may be telematics providers serving as intermediaries between the data center and each mobile network (for example, a different telematics provider may be employed in each different country or region). Accordingly, the communication path from the data center to a DCM in a vehicle located somewhere in the world may involve many steps as the data moves from one network to another or from one network provider to another. This multi-stage process can add many seconds to the data transmittal, which could cause a driver who sends, for example, a remote start command from a mobile device to have to wait before the command reaches the vehicle and is executed.

SUMMARY

Disclosed herein are computer devices, systems, and methods for enabling persistent data connections with a vehicle and low-latency vehicle commands. A driver can use an app installed on a mobile device to send commands to a vehicle's DCM, and the DCM can execute such commands on one or more vehicle systems, such as remote ignition and door lock systems. A wakeup command can be sent to the DCM through a mobile network upon the initialization of the mobile app to establish a persistent connection between a data center and the DCM. Then, when the driver issues a command from the app, the command can be communicated between the data center and the DCM directly, with lower latency.

In one implementation, a computer-implemented method for enabling persistent data connections with a vehicle and low-latency vehicle commands is disclosed. The method includes establishing a persistent data connection between a server computer and a vehicle computing device associated with a vehicle upon initialization of a mobile app running on a mobile device in communication with the server computer; presenting to a user of the mobile app, after the persistent data connection is established, an option to select a command for a vehicle system in communication with the vehicle computing device; sending to the vehicle computing device, by the server computer using the persistent data connection, a command selected by the user; and executing, by the vehicle computing device, the selected command on the vehicle system.

In another implementation, a system is disclosed, which includes a server computer; a mobile device in communication with the server computer; a vehicle computing device in communication with the server computer; and a vehicle system in communication with the vehicle computing device; wherein the server computer is configured to: establish a persistent data connection with the vehicle computing device upon initialization by a user of a mobile app running on the mobile device; cause the mobile app to present to a user of the mobile app, after the persistent data connection is established, an option to select a command for the vehicle system; receive from the mobile device a selected command; and send, using the persistent data connection, the selected command to the vehicle computing device to execute on the vehicle system.

In another implementation, a computing device for a vehicle is disclosed. The computing device includes one or more processors for controlling the operations of the computing device; and a memory for storing data and program instructions used by the one or more processors, wherein the one or more processors are configured to execute instructions stored in the memory to: receive a wakeup command from a server computer upon initialization of a mobile app running on a mobile device in communication with the server computer; connect to the server computer using a persistent data connection; receive from the server computer using the persistent data connection a command selected by a user of the mobile app; and execute the command on a vehicle system.

DETAILED DESCRIPTION

Disclosed herein are computer devices, systems, and methods for enabling persistent data connections with a vehicle and low-latency vehicle commands. A driver can use a mobile app installed on a mobile device to send commands to a vehicle's DCM, which can execute such commands on one or more vehicle systems, such as remote ignition and door lock systems. The driver can initialize the mobile app by logging into a remote server located in a data center. Upon initialization of the mobile app, this data center server can establish a persistent data connection with the DCM using one or more intermediary servers. In particular, the data center server can send a wakeup command to the DCM through the one or more intermediary servers. The intermediary servers can include a telematics server and a mobile network server. The wakeup command can be sent using an SMS message. When the DCM receives the wakeup command it can connect directly to the data center server; thereby, the persistent data connection, once established, can be a direct connection between the data center server and the DCM.

Once the persistent data connection is established, the driver can select one or more commands for vehicle systems using the mobile app. The driver's command selection can be sent to the data center server, and the data center server can send the selected command directly to the DCM using the persistent data connection, without the need to connect through the intermediary servers. Accordingly, the driver is able to issue commands to the DCM with much lower latency. The persistent data connection can be maintained using long polling or similar techniques. After a predetermined timeout period in which the driver has not used the mobile app, the persistent data connection can be terminated.

Figure 1:
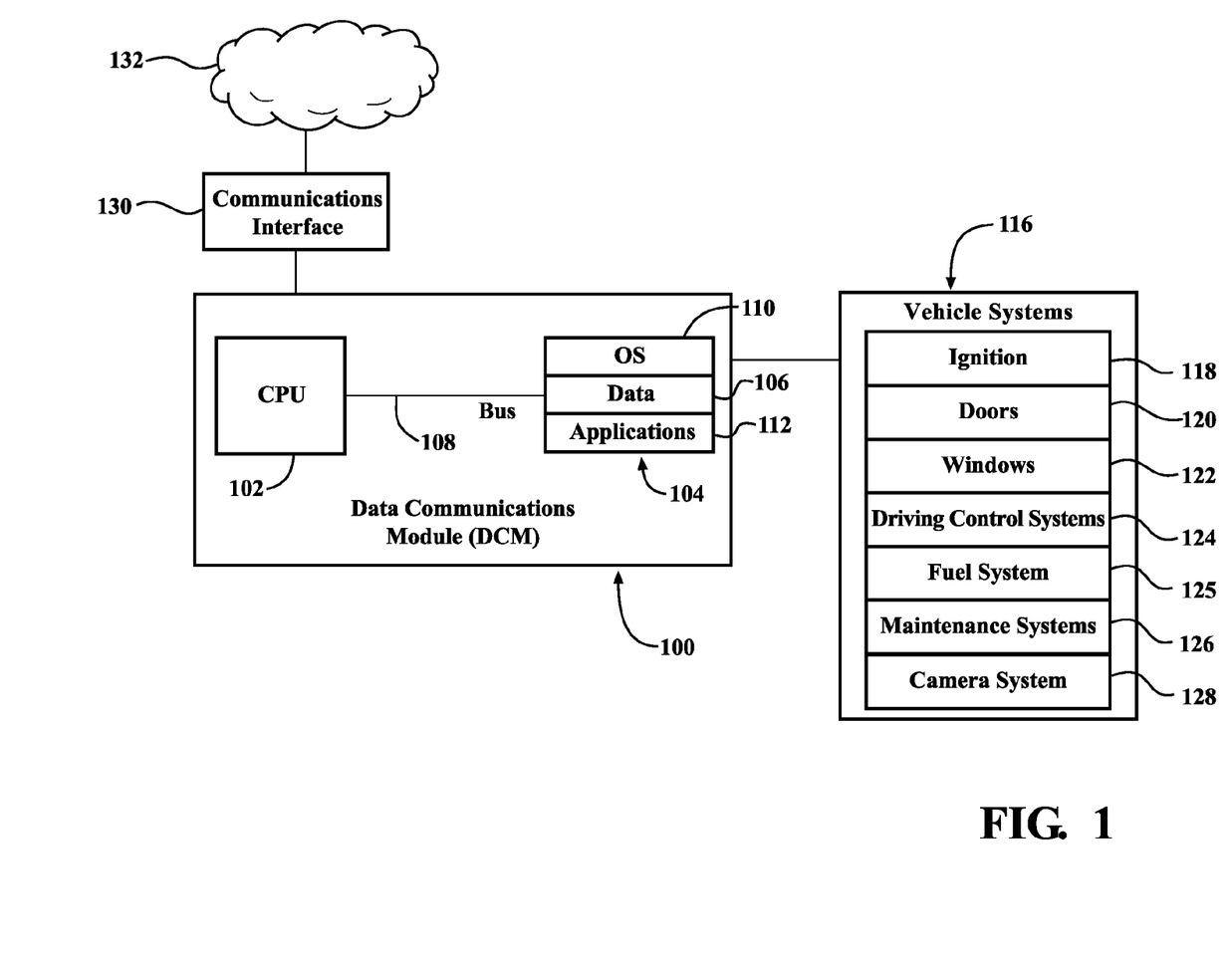
FIG. 1 is a schematic block diagram of a computing device associated with a vehicle for enabling persistent data connections and low-latency vehicle commands.
Figure 2:
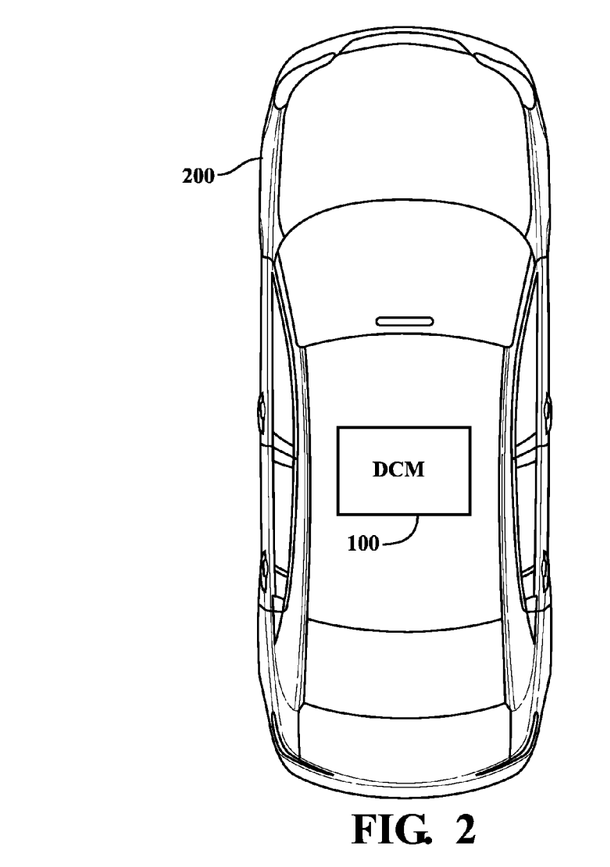
FIG. 2 is a pictorial representation of a vehicle including the computing device of FIG. 1.

FIG. 1 is a schematic block diagram of a DCM 100 associated with a vehicle (such as the vehicle depicted in FIG. 2). The DCM 100 can be any type of vehicle-installed, handheld, desktop, or other form of single computing device, or can be composed of multiple computing devices. A processing unit 102 in the DCM 100 can be a conventional central processing unit (CPU) or any other type of device, or multiple devices, capable of manipulating or processing information. A memory 104 in the DCM 100 can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs or apps that permit the CPU 102 to implement the remote vehicle commands, as described in more detail below.

The DCM 100 can be in direct or indirect communication with one or more vehicle systems 116 to control various vehicle functions. Example vehicle systems 116 can include systems controlling the vehicle's ignition 118, doors 120 (e.g., for locking and unlocking), windows 122, or driving control systems 124 (such as traction or steering control systems). Additionally, vehicle systems 116 can include systems providing information back to the DCM 100, such as through the use of various sensors. Examples include a fuel system 125, which can report the amount of remaining fuel left in the vehicle's fuel tank, or various maintenance systems 126, which can report a variety of maintenance conditions, such as tire pressure or oil level, or the like. The DCM 100 can also be in direct or indirect communication with a camera system 128 that can include one or more cameras (such as backup cameras or security cameras). The camera system 128 can receive commands from the DCM 100 and send data (such as image data) to the DCM 100.

The DCM 100 can also include a communications interface 130 through which the DCM 100 can communicate with external sources over a network 132 such as the internet.

FIG. 2 is a pictorial representation of a vehicle 200 in direct or indirect communication with the DCM 100. The DCM 100 can be located within the vehicle 200 or can be located remotely from the vehicle 200 in an alternate location. If the DCM 100 is remote from the vehicle, the vehicle 200 can include the capability of communicating with the DCM 100, such as through the communications interface 130.

Figure 3:
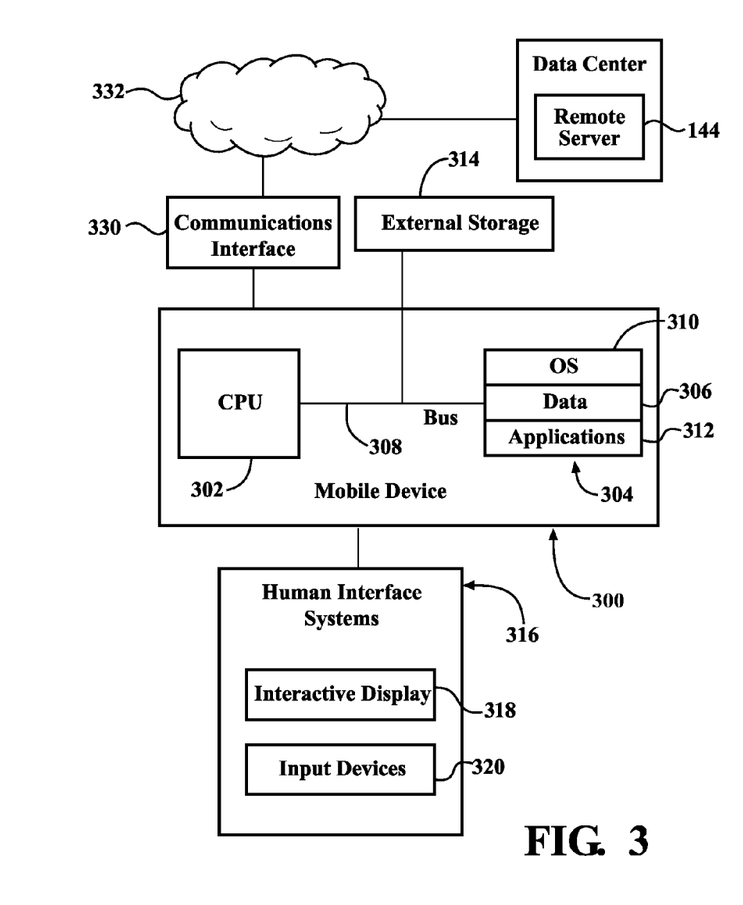
FIG. 3 is a schematic block diagram of a mobile device that can be used to send low-latency commands to the computing device of FIG. 1.

FIG. 3 is a schematic block diagram of a mobile device that can communicate with the DCM 100. The mobile device 300 can be any type of mobile, handheld, or personal computing device, such as a smartphone or tablet computer, or a wearable computing device. A processing unit 302 in the mobile device can be a conventional central processing unit (CPU) or any other type of device, or multiple devices, capable of manipulating or processing information. A memory 304 in the mobile device can be a random access memory device (RAM) or any other suitable type of storage device. The memory 304 can include data 306 that is accessed by the CPU 302 using a bus 308.

The memory 304 can also include an operating system 310 and installed applications 312, the installed applications 312 including programs or apps that permit the CPU 302 to implement the remote vehicle commands, as described in more detail below. The mobile device 300 can also include secondary, additional, or external storage 314, for example, a memory card, flash drive, or any other form of computer readable medium, including on a user's external mobile device. In one implementation, the installed applications 312 can be stored in whole or in part in the external storage 314 and loaded into the memory 304 as needed for processing.

The mobile device 300 can include human interface systems 316 that allow information to be presented to the user and also allow the user to issue commands, requests, or other inputs. Example human interface systems 316 include an interactive display 318 and one or more input devices 320 such as buttons, a keyboard, mouse, or voice recognition system. The applications 312 can include a mobile app that allows the driver to select commands using the interactive display 318 and/or input devices 320. These commands can be sent from the mobile app on the mobile device 300 to the DCM 100 as described below.

Figure 4:
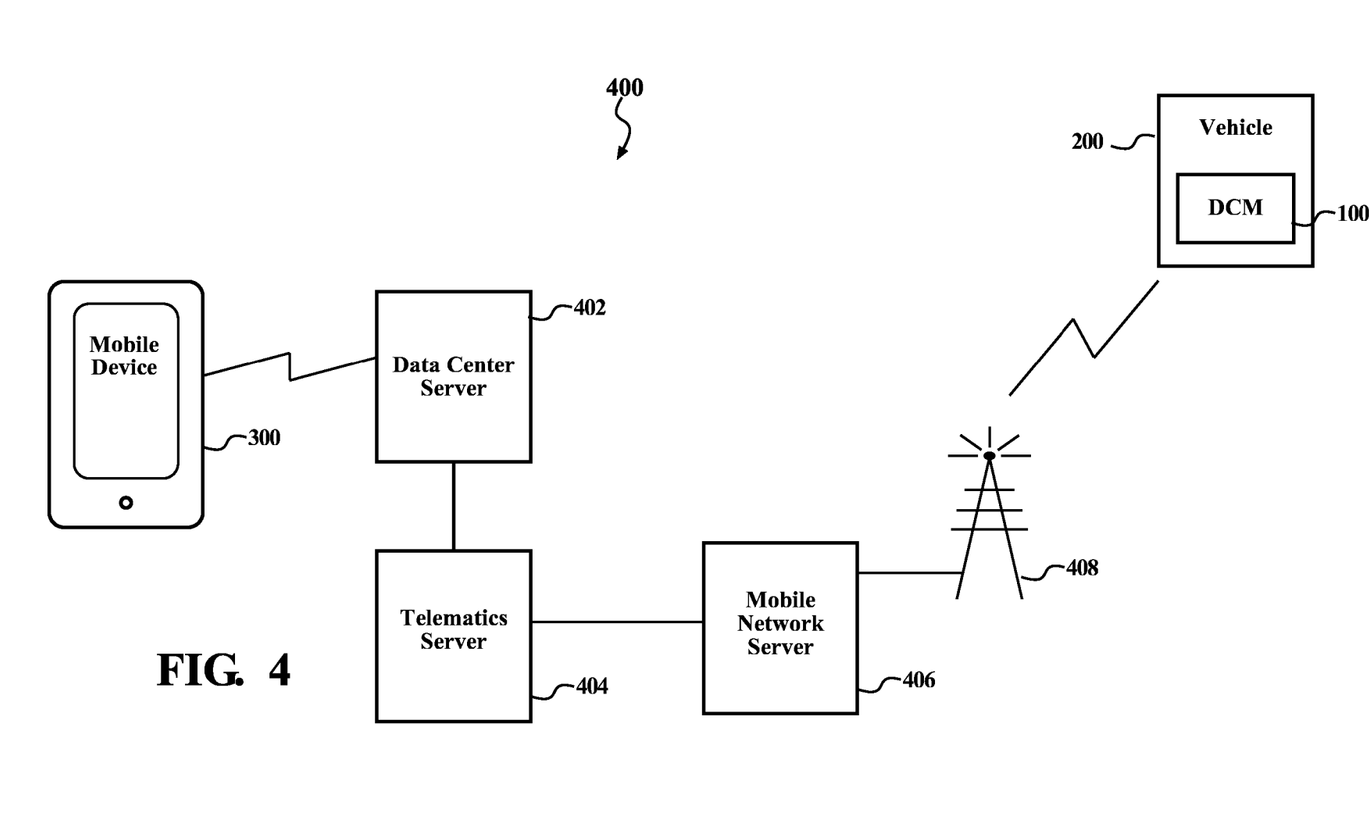
FIG. 4 is a schematic block diagram of a system for enabling persistent data connections and low-latency vehicle commands including the computing device of FIG. 1, the vehicle of FIG. 2, and the mobile device of FIG. 3.

FIG. 4 is a schematic block diagram of a system 400 including the DCM 100 and the mobile device 300. The system can include a data center server 402, a telematics server 404, a mobile network server 406, and the vehicle 200 including the DCM 100. The mobile device 300 can connect to the data center server 402. Each of the data center server 402, telematics server 404, and mobile network server 406 can also include one or more computers, servers, communications channels, networks, communications towers, satellites, and satellite receivers, without departing from the scope of the instant disclosure.

In one example implementation, it is possible that the various networks and nodes of the system (i.e., the data center server 402, telematics server 404, and mobile network server 406) can communicate using different protocols and methods. For example, the telematics server 404 and the data center server 402 may communicate using internet (packet-based) protocols such as HTTP. On the other hand, the mobile network server 406 may send messages via the SMS (short message service) protocol familiar to those skilled in the art. It can be advantageous for the DCM 100 to not maintain a constant connection to the mobile network server 406 in order to preserve battery life or to alleviate congestion on the mobile network, or for any other reason. Accordingly, the DCM 100 can be configured to accept SMS messages, which can "wake up" the DCM 100 and allow it to connect to another remote server, such as the data center server 402 or telematics server 404. An example SMS message that can be received by the DCM 100 can include an instruction for the DCM 100 to activate a remote communication service. Upon activating the remote communication service, the DCM 100 can access a lookup table, for example, stored in the memory 104, which can include an IP address or URL (uniform resource locator) of a remote server for the DCM 100 to connect to. The SMS message can also include other information such as a time/date stamp and/or an identification of the sender of the SMS message. In some network topologies, in order for the data center server 402 to wake up the DCM 100, the data center server 402 may need one or more intermediary servers to convert its requests into requests that conform to the standards set by the mobile network provider, for example for sending SMS messages. The telematics server 404 is one such example intermediary server.

Figure 5:
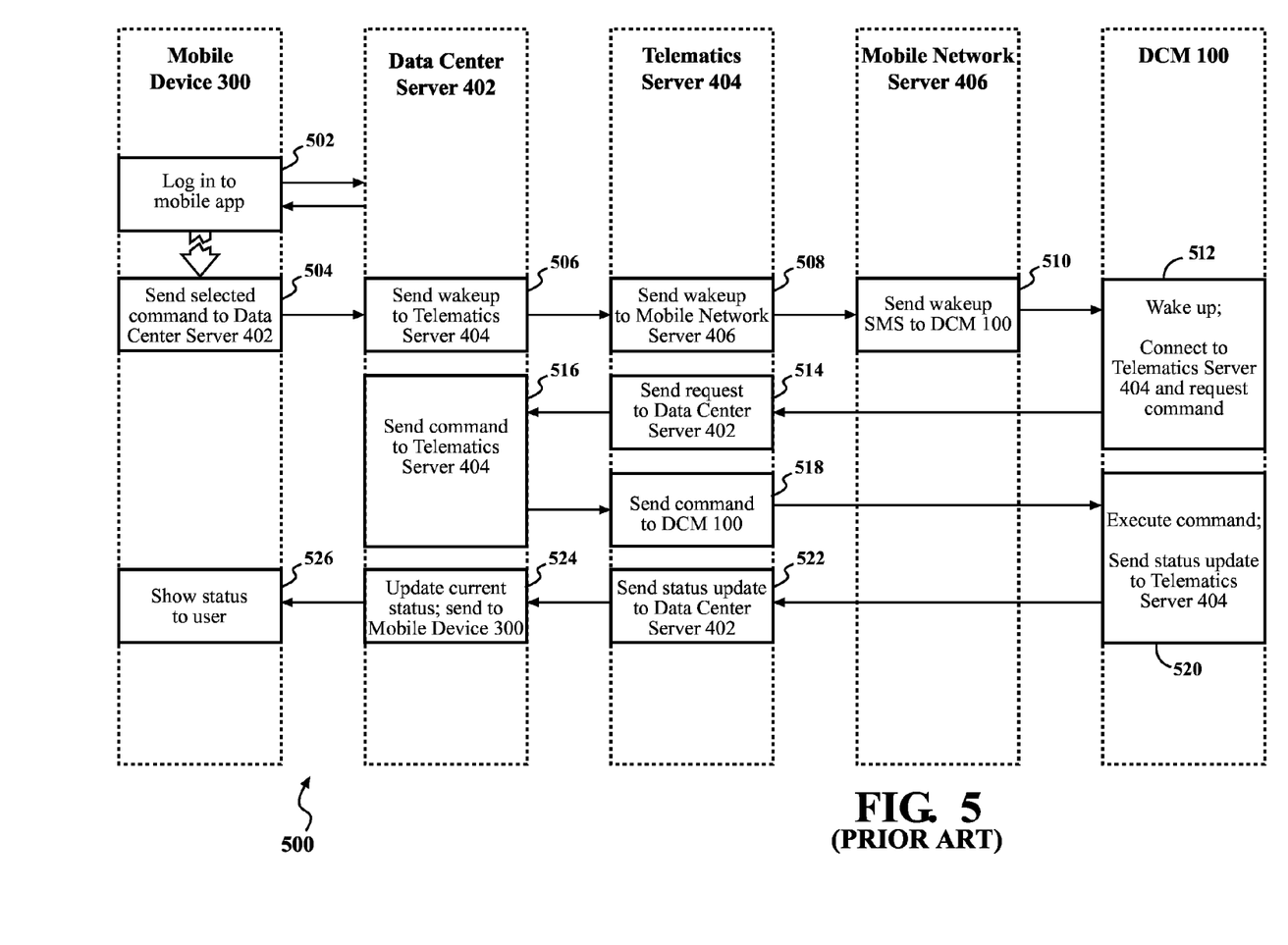
FIG. 5 is a logic flowchart of a prior art process for internet-based control of vehicle systems.

FIG. 5 is a logic flowchart of a prior art process 500 for internet-based control of vehicle systems. With this prior art process 500, a user such as the driver can access a mobile app installed on the mobile device 300, which can be a smart phone or tablet computer, or another type of personal computing device (such as a wearable computing device). At step 502, the driver initializes the mobile app by connecting to the data center server 402 and authenticating credentials such as a user name and password. After the driver logs into the mobile app, the driver can be presented with options for controlling various vehicle systems 116. Using the mobile app, the driver can select a command for a vehicle system 116, such as, for example, remotely starting the vehicle's ignition 118. When the driver selects a command, the prior art process 500 continues to step 504. At step 504, when the driver selects a command, the mobile app causes the mobile device 300 to send the command to the data center server 402.

In order for the data center server 402 to send the command to the DCM 100, the DCM 100 must be ready to connect to an external source. Therefore, steps 506 through 512 address "waking up" the DCM 100. Specifically, at step 506, the data center server prepares a request for a "wakeup" command to be sent to the DCM 100, and this request is sent to the telematics server 404. At step 508, the telematics server 404 sends a request to the mobile network server 406 to issue an SMS message including the wakeup command to the DCM 100. At step 510, the mobile network server 406 sends the SMS message including the wakeup command to the DCM 100.

At step 512, upon receiving the SMS including the wakeup command, the DCM 100 wakes up. The wakeup command can cause the DCM 100 to activate the remote communication service and lookup (for example, from the memory 104) an internet address, such as an address for the telematics server 404. The DCM 100 can then initiate a data connection to the server at such address (such as the telematics server 404). This connection can be made using an internet-based (i.e., packet-based) protocol such as HTTP rather than SMS. Accordingly, the DCM 100 can connect to the telematics server 404 and request a command. At step 514, the telematics server 404 sends the DCM's 100 request to the data center server 402. At step 516, upon receiving the DCM's 100 request for a command, the data center server 402 generates a command for a vehicle system 116 based on the selection of the driver using the mobile app, and sends the selected command to the telematics server 404. At step 518, the telematics server 404 sends the command to the DCM 100. At step 520, the DCM 100 receives the command and executes it on the relevant vehicle system 116. The DCM 100 can also send back to the telematics server 404 a status update acknowledging that the command has been executed successfully. At step 522, the telematics server 404 sends the status to the data center server 402. At step 524, the data center server 402 is updated with the most current information reported by the DCM 100, such as status of the engine. The status can also be sent (pushed) to the mobile app at the mobile device 300, or made available for the mobile app to retrieve (pull) the status from the data center server 402. At step 526, the mobile app receives the updated status and notifies the driver.

In the foregoing example implementation illustrated in FIG. 5, if the driver subsequently selects another command from the app, the entire process 500 is performed again. In addition, the communication between the data center server 402 and the telematics server 404 can be made secure using encrypted communication protocols such as HTTPS (for example, at steps 506, 514, 516, and 522). However, such encryption standards are generally not supported by existing vehicle data communications modules and SMS servers such as the mobile network server 406.

Figure 6:
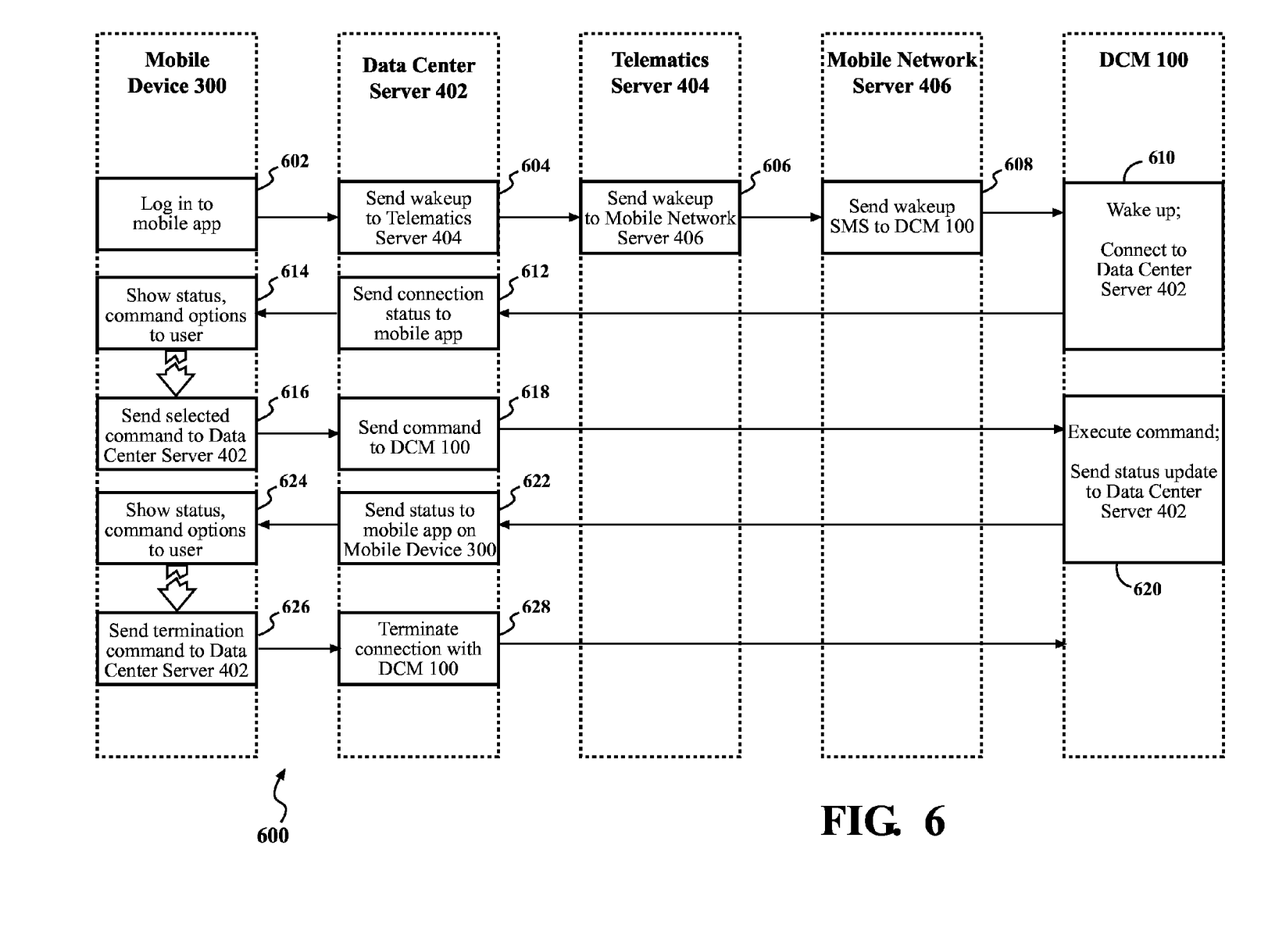
FIG. 6 is a logic flowchart of an example process for internet-based control of vehicle systems improved over the prior art process.

FIG. 6 is a logic flowchart of an example process 600 for internet-based control of vehicle systems 116, illustrating an improved implementation over the prior art. In this example implementation, a direct, persistent connection between the data center server 402 and the DCM 100 at the vehicle 200 can be established using encrypted communications and maintained using long polling techniques (or similar techniques) in accordance with the following steps.

At step 602, the user (such as the driver) initializes the app, for example by logging in to the data center server 402 using a user name and password. Steps 604 through 610 describe the "wakeup" command sent to the DCM 100 by the data center server 402 using one or more intermediate servers. At step 604, after the data center server 402 authenticates the driver and the mobile app is initialized, the data center server can send a request to the telematics server 404 to prepare a wakeup command for the DCM 100. At step 606, the telematics server 404 sends a request to the mobile network server 406 to issue an SMS message including the wakeup command to the DCM 100. At step 608, the mobile network server 406 sends the SMS message including the wakeup command to the DCM 100. The SMS message can also include other information such as a time/date stamp and/or an identification of the sender of the SMS message.

The steps involving waking up the DCM 100 are equivalent to the corresponding steps in the prior art process 500 illustrated in FIG. 5, except that the wakeup of the DCM 100 is initiated earlier, when the driver logs in and initializes the mobile app, rather than when the driver selects a command option using the mobile app. Once the DCM 100 is woken up, however, the implementations diverge. In particular, at step 610, upon receiving the SMS including the wakeup command, the DCM 100 wakes up. The wakeup command can cause the DCM 100 to activate the remote communication service and lookup (for example, from the memory 104) an internet address, such as an address for the data center server 402. In this example implementation, the DCM 100 can connect to remote servers using encrypted communications protocols, such as HTTPS. Accordingly, the DCM 100 can directly connect to the data center server 402 using a secure protocol and establish a persistent connection. The persistent connection can be maintained (i.e., kept alive) using long polling techniques familiar to those skilled in the art. Other persistent connection methods known in the art, such as (short) polling or streaming, can also be used without departing from the spirit of the instant disclosures. The persistent connection can be available for two-way communication. Therefore, when the data center server 402 has data to send back to the DCM 100, it will use the same connection instead of initiating a new connection.

At step 612, the data center server 402 can send (push) a notification to the mobile app at the mobile device 300 that a connection has been established with the DCM 100. At step 614, upon receiving confirmation that a persistent connection has been established, the mobile app can display the command options for controlling vehicle systems 116 to the driver. The commands may be presented to the driver in a menu format, or as standalone buttons, or using any other graphical indication as may be known in the art. When the driver selects a command, the process 600 continues to step 616. At step 616, the mobile app causes the mobile device 300 to send the selected command to the data center server 402. At step 618, the data center server 402 sends the selected command directly to the DCM 100 using the existing connection established in step 610. At step 620, the DCM 100 can execute the command on the relevant vehicle system 116, for example starting the ignition 118 or unlocking the doors 120. The DCM 100 can also send a status update or acknowledgement of success to the data center server 402 (for example, reporting that the engine is on). As part of the status update, the DCM 100 can also send back any related data regarding this or other vehicle systems 116. For example, the DCM 100 can report the amount of fuel that is left in the vehicle 200 using data received from the fuel system 125. The DCM 100 can also send back data received from the maintenance systems 126 or image information received from the camera systems 128.

In any case, any information sent back to the data center server 402 from the DCM 100 can be sent over the existing persistent connection established at step 610. At step 622, the data center server 402 is updated with the most current information reported by the DCM 100 (e.g., that the engine is now on or the doors are now unlocked, etc.). The status can also be sent (pushed) to the mobile app at the mobile device 300, or made available for the mobile app to retrieve (pull) the status from the data center server 402. At step 626, command options are presented to the driver, who can continue to select additional commands. The optional status updates and other information can be presented to the driver as well.

In the foregoing example implementation illustrated in FIG. 6, because the connection is established upon app initialization and is established as a persistent connection, if the driver wishes to select another command to the DCM 100, steps 616-624 can be repeated as many times as needed, without requiring the wakeup process indicated in steps 602-610.

In one example implementation, the persistent connection between the data center server 402 and the DCM 100 can be terminated after a predefined amount of time in which there has not been any user activity on the mobile app. For example, any predefined amount of time between five and fifteen minutes can be used. In the example implementation illustrated in FIG. 6, the app has timed out due to lack of usage prior to step 626. Thus, at step 626, which takes place after the predefined amount of time has passed, the app causes the mobile device 300 to send a termination message to the data center server 402. At step 628, the data center server 402 sends a termination message to the DCM 100 over the current persistent connection and disconnects the connection with the DCM 100. This time period can be independent of the mobile device's 300 operating system's timeout procedures, so that even if the mobile device 300 becomes locked due to lack of usage, if the mobile app's timeout period has not yet passed, then the driver will—upon unlocking the mobile device 300 and re-accessing the mobile app—still be able to send commands to the DCM 100 using the existing persistent data connection without requiring new wakeup commands.

In accordance with the instant disclosure, the multi-stage vehicle wakeup, which involves multiple third parties such as the telematics server 404 provider and the mobile network server 406 provider and non-packet-based communication protocols such as SMS, only needs to be executed once, upon initializing the mobile app. Because a persistent data connection between the data center server 402 and the DCM 100 at the vehicle 200 is established at such time, the connection will already be in place by the time the driver selects a command. Accordingly, the driver will experience a much faster response time upon issuing a command to the vehicle 200.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. For example, in the embodiments described above, the vehicle 200 is generally described an automobile. However, the vehicle 200 is not limited to an automobile, as the disclosed systems and methods could also be implemented with other vehicles generally controlled by a driver, or operator, such as airplanes, boats, trains, etc. In addition, when the data center server 402 sends data to the app at the mobile device 300, either "push" or "pull" methods may be employed, as such methods are known in the art. In addition, the number and types of remote servers employed (i.e., the data center server 402, telematics server 404, and mobile network server 406) may vary depending on the complexity and requirements of the system without departing from the spirit and scope of the appended claims. In particular, more or fewer intermediary remote servers may be necessary to perform the initial wakeup of the DCM 100. In addition, the user of the mobile app is identified as the driver of the vehicle 200 in the instant disclosure. However, the user may be any authorized user without departing from the spirit and scope of the appended claims. The scope of the claims is thus to be accorded the broadest interpretation so as to encompass all such modifications and equivalent structures as is permitted under the law.

What is claimed is:
1. A method comprising:
  establishing a persistent data connection between a server computer and a vehicle computing device associated with a vehicle upon initialization of a mobile app running on a mobile device in communication with the server computer;
  presenting to a user of the mobile app, after the persistent data connection is established, an option to select a command for a vehicle system in communication with the vehicle computing device, the vehicle system controlling at least one of a vehicle ignition, one or more vehicles windows, or a vehicle door lock;
  sending to the vehicle computing device, by the server computer using the persistent data connection, a command selected by the user, the command being at least one of starting the vehicle ignition, stopping the vehicle ignition, locking the vehicle door lock, unlocking the vehicle door lock, or adjusting a position of one or more vehicle windows;

executing, by the vehicle computing device, the selected command on the vehicle system to cause at least one of the vehicle ignition to be started, the vehicle ignition to be stopped, the vehicle door lock to be locked, the vehicle door lock to be unlocked, or the position of one or more vehicle windows to be adjusted; and terminating the persistent data connection if a timeout period has elapsed without any usage on the mobile device.

2. The method of claim 1, wherein the persistent data connection is established using one or more intermediary servers, but once established, the persistent data connection is a direct connection between the server computer and the vehicle computing device.

3. The method of claim 1, wherein the persistent data connection is established by sending a wakeup command to the vehicle computing device.

4. The method of claim 3, wherein the wakeup command comprises an SMS message.

5. The method of claim 1, wherein the initialization of the mobile app comprises authenticating the user.

6. The method of claim 1, wherein the persistent data connection is maintained using long polling.

7. The method of claim 1, further comprising sending, by the vehicle computing device to the server computer, information relating to a status of the vehicle.

8. A system comprising:
a server computer;
a mobile device in communication with the server computer;
a vehicle computing device in communication with the server computer; and
a vehicle system in communication with the vehicle computing device, the vehicle system controlling at least one of a vehicle ignition, one or more vehicle windows, or a vehicle door lock;
wherein the server computer is configured to:
establish a persistent data connection with the vehicle computing device upon initialization of a mobile app running on the mobile device;
cause the mobile app to present to a user of the mobile app, after the persistent data connection is established, an option to select a command for the vehicle system, the command being at least one of starting the vehicle ignition, stopping the vehicle ignition, locking the vehicle door lock, unlocking the vehicle door lock, or adjusting a position of one or more vehicles windows;
receive from the mobile device a selected command;
send, using the persistent data connection, the selected command to the vehicle computing device to execute on the vehicle system to cause at least one of the vehicle ignition to be started, the vehicle ignition to be stopped, the vehicle door to be locked, the vehicle door lock to be unlocked, or a position of one or more vehicle windows to be adjusted; and
terminate the persistent data connection if a timeout period has elapsed without any usage on the mobile device.

9. The system of claim 8, wherein the server computer establishes the persistent data connection using one or more intermediary servers, but once established, the persistent data connection is a direct connection between the server computer and the vehicle computing device.

10. The system of claim 8, wherein the server computer establishes the persistent data connection by sending a wakeup command to the vehicle computing device.

11. The system of claim 10, wherein the wakeup command comprises an SMS message.

12. The system of claim 8, wherein the persistent data connection is maintained using long polling.

13. The system of claim 8, wherein the server computer further receives from the vehicle computing device information relating to a status of the vehicle.

14. A computing device for a vehicle comprising:
one or more processors for controlling the operations of the computing device; and
a memory for storing data and program instructions used by the one or more processors, wherein the one or more processors are configured to execute instructions stored in the memory to:
receive a wakeup command from a server computer upon initialization of a mobile app running on a mobile device in communication with the server computer;
connect to the server computer using a persistent data connection;
receive from the server computer using the persistent data connection a command selected by a user of the mobile app, the command being at least one of starting a vehicle ignition, stopping the vehicle ignition, locking a vehicle door lock, unlocking the vehicle door lock, or adjusting a position of one or more vehicle windows;
execute the selected command on a vehicle system to cause at least one of the vehicle ignition to be started, the vehicle ignition to be stopped, the vehicle door lock to be locked, the vehicle door lock to be unlocked, or the position of one or more vehicle windows to be adjusted; and
terminate the persistent data connection if a timeout period has elapsed without any usage on the mobile device.

15. The computing device of claim 14, wherein the wakeup command is received from the server computer via one or more intermediary servers, and wherein the persistent data connection is a direct connection with the server computer.

16. A computing device for a vehicle comprising:
one or more processors for controlling the operations of the computing device; and
a memory for storing data and program instructions used by the one or more processors, wherein the one or more processors are configured to execute instructions stored in the memory to:
receive a wakeup command from a server computer upon initialization of a mobile app running on a mobile device in communication with the server computer;
connect to the server computer using a persistent data connection;
receive from the server computer using the persistent data connection a command selected by a user of the mobile app, the command including changing a driving setting of the vehicle, the driving setting being one of a traction setting or a steering setting;
execute the selected command on a driving control system of the vehicle to cause the driving setting to be changed, the driving control system being one of a traction control system or a steering control system; and terminate the persistent data connection if a timeout period has elapsed without any usage on the mobile device.

17. A computing device for a vehicle comprising:
one or more processors for controlling the operations of the computing device;
one or more sensors operatively connected to the one or more processors, the one or more sensors being configured to acquire vehicle information; and
a memory for storing data and program instructions used by the one or more processors, wherein the one or more processors are configured to execute instructions stored in the memory to:
  receive a wakeup command from a server computer upon initialization of a mobile app running on a mobile device in communication with the server computer;
  connect to the server computer using a persistent data connection;
  receive from the server computer using the persistent data connection a command selected by a user of the mobile app, the command including a request for vehicle information;
  execute the selected command on a vehicle system to cause at least one of:
    the one or more sensors to acquire the requested vehicle information, or
    the requested vehicle information to be sent to at least one of the mobile device or the server computer; and
  terminate the persistent data connection if a timeout period has elapsed without any usage on the mobile device.

* * * * *

UNITED STATES PATENT AND TRADEMARK OFFICE
CERTIFICATE OF CORRECTION

PATENT NO. : 9,676,385 B2  
APPLICATION NO. : 14/490281  
DATED : June 13, 2017  
INVENTOR(S) : Daniel D. Kang Page 1 of 1

It is certified that error appears in the above-identified patent and that said Letters Patent is hereby corrected as shown below:

Claim 1, Column 8, Line 63: delete "vehicles windows," and insert --vehicle windows,--.
Claim 8, Column 9, Line 51: delete "vehicles windows;" and insert --vehicle windows;--.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*